United States Patent
Sadek Sadek et al.

(10) Patent No.: US 10,121,257 B2
(45) Date of Patent: Nov. 6, 2018

(54) COMPUTER-IMPLEMENTED METHOD AND SYSTEM FOR PROCESSING VIDEO WITH TEMPORAL CONSISTENCY

(71) Applicant: RATIONAL PIXELS S.L., Barcelona (ES)

(72) Inventors: Rida Sadek Sadek, Barcelona (ES); Juan Francisco Garamendi, Fuenlabrada (ES); Pablo Arias Martinez, Barcelona (ES)

(73) Assignee: RATIONAL PIXELS S.L., Barcelona (ES)

( * ) Notice: Subject to any disclaimer, the term of this patent is extended or adjusted under 35 U.S.C. 154(b) by 0 days.

(21) Appl. No.: 15/603,604

(22) Filed: May 24, 2017

(65) Prior Publication Data

US 2017/0345163 A1    Nov. 30, 2017

(30) Foreign Application Priority Data

May 25, 2016    (EP) ..................................... 16382233

(51) Int. Cl.
| | |
|---|---|
| *G06K 9/40* | (2006.01) |
| *G06T 7/246* | (2017.01) |
| *G06T 7/215* | (2017.01) |
| *G11B 27/028* | (2006.01) |
| *H04N 19/51* | (2014.01) |

(52) U.S. Cl.
CPC .............. *G06T 7/251* (2017.01); *G06T 7/215* (2017.01); *G11B 27/028* (2013.01); *H04N 19/51* (2014.11); *G06T 2207/10016* (2013.01)

(58) Field of Classification Search
CPC ........... G06T 2207/10016; G06T 7/246; G06T 2207/20021; G06T 2207/30168
USPC ............... 382/260, 274, 275, 282, 284, 307; 348/96, 154, 208.4, 239
See application file for complete search history.

(56) References Cited

U.S. PATENT DOCUMENTS

| | | | | |
|---|---|---|---|---|
| 7,133,080 B2 * | 11/2006 | Kobayashi | ............. | H04N 5/144 348/663 |
| 7,787,010 B2 * | 8/2010 | DiFrancesco | ............ | H04N 5/87 348/96 |
| 8,059,915 B2 * | 11/2011 | Sharon | .................... | G06T 7/246 358/3.26 |
| 8,184,904 B2 * | 5/2012 | Kodavalla | ............... | G06T 5/009 358/520 |
| 8,768,438 B2 * | 7/2014 | Mestha | ................ | A61B 5/0044 600/473 |

(Continued)

*Primary Examiner* — Yosef Kassa
(74) *Attorney, Agent, or Firm* — Lucas & Mercanti, LLP

(57) ABSTRACT

System and computer-implemented method for editing a video sequence with temporal consistency. The method includes the steps of: computing a motion field modeling temporal consistency between successive frames; defining an energy functional modeling the desired properties to be enforced on the video sequence; splitting the video sequence into two sets with even frames and odd frames; computing the motion field between consecutive frames on the splitted sequences; recursively performing steps until the sets to be split contain one frame to edit; minimizing the energy functional for each set containing one frame to edit; merging the edited frames and outputting the edited video sequence.

7 Claims, 9 Drawing Sheets

(56) References Cited

U.S. PATENT DOCUMENTS 8,792,969 B2 * 7/2014 Bernal ................ A61B 5/091
　　　　　　　　　　　　　　　　　　　600/476
8,977,347 B2 * 3/2015 Mestha ............... A61B 5/7235
　　　　　　　　　　　　　　　　　　　600/473

* cited by examiner

COMPUTER-IMPLEMENTED METHOD AND SYSTEM FOR PROCESSING VIDEO WITH TEMPORAL CONSISTENCY

CROSS REFERENCE TO RELATED APPLICATION

This application claims the priority of European Patent Application No. EPO 16382233.1 filed on May 25, 2016, which is incorporated herein by reference.

FIELD OF THE INVENTION

The present invention is comprised within the fields of video processing and video editing, by which a given video is modified to achieve a certain goal.

BACKGROUND OF THE INVENTION

Digital editing of a captured video footage has become a common step for movie post-production, mainly due to advances in the fields of computer graphics and computer vision. Video editing tasks vary from basic operations such as trimming, cutting, splitting and resizing video segments to more elaborate ones such as effects filters, editing of object textures, removing and adding objects in a video segment, among others.

A significant difference between video and still image editing is the requirement that the result has to be temporally consistent. Temporal consistency refers to a smooth transition between successive frames, coherent with the motion of the objects in the sequence. Due to this constraint, the editing of a video cannot be reduced to a series of independent image editing problems. The temporal interdependence imposed by the motion has to be taken into account.

Many approaches to video editing estimate motion trajectories from the video, and compute the edited video as the minimizer of an energy functional. In this context the video, or a region of interest (ROI) in it, is represented as a vector in $R^N$ where the number of variables N corresponds to the number of pixels in the ROI. For example for a rectangular ROI of width W, height H, T frames and the color is encoded using a 3 channels color space, e.g. RGB, we have N=3W HT. The edited video is then computed by the minimization of an energy functional $E: R^N \to R$ with a suitable optimization tool. The energy functional is designed seeking that its minimizers have the "desired properties". These properties are dictated by the specific editing task and certain general properties, such as temporal and spatial consistency.

In particular, we focus on video energy functionals having the following structure:

$$E(u) = \sum_{t=0}^{T} E_t^e(u_t) + \sum_{t=0}^{T-1} E_{t,t+1}^{tc}(u_t, u_{t+1}) \quad \text{(Eq. 1)}$$

Here $u \in R^N$ denotes the vectorized unknown video, t=0, ..., T is the frame index, and $u_t$ represents the t-th frame of u (also as a vector). Equation (Eq. 1) states that the energy E can be decomposed as a sum of two types of terms.

The terms in the first summation consist of single-frame energies $E_t^e(u_t)$. Their specific form depends on the editing tasks. For example, single-frame editing energies like the following have been used often in the literature:

$$E_t^e(u_t) = \sum_{x \in \Omega} (u(x,t) - f(x,t))^2 + \frac{\lambda}{p} \sum_{x \in \Omega} |\nabla u(x,t) - g(x,t)|^p. \quad \text{(Eq. 1.1)}$$

Here $\Omega$ denotes the frame domain (typically a rectangle), $x \in \Omega$ is pixel location, i.e, u(x,t) is the grey or color level of the pixel located at x from the frame t of video u. $\nabla$ is a discrete spatial gradient operator (for example using finite differences), $\lambda$, p$\in$R are parameters of the energy, f is a video and g is a vector field (for example the spatial gradient of a video); f and g are given, typically as the result of a previous processing step. The first summation is a quadratic attachment to the given video f and the second summation is an attachment in the p-norm to the discrete gradient g. As an example, a smoothing filter can be designed by setting f as the original video, and g=0. If p=2 the resulting smoothing is equivalent to a Gaussian blur of the original video. If p=1, the smoothing preserves edges. As another example, the energy can be also used to generate a "cartoon filter" by defining g as simplified version of the gradient of the original video, keeping only large gradients (associated to significant edges) and removing smaller gradients (associated to texture, details, etc). These examples are only given here to fix ideas. The specific form of the single-energy term $E_t^e$ depends on the desired editing, and may not have the structure given in Eq.1.1, except for the fact that it only depends on frame t.

The terms in the second summation $E_{t,t+1}^{tc}(u_t, u_{t+1})$ couple pairs of contiguous frames. Their aim is to enforce the temporal consistency by penalizing some measure of the variation of the video along a motion trajectory. The specific form of the temporal consistency terms $E_t^{tc}(u_t, u_{t+1})$ depends on the choice of the temporal consistency criterion. Examples will be given bellow.

Without the temporal coupling enforced by the temporal consistency terms $E_t^{tc}(u_t, u_{t+1})$, the minimization of the resulting energy reduces to the minimizations of the single-frame terms $E_t^e(u_t)$. Each of these can be minimized independently for each frame. While this is attractive from a computational point of view since it allows for parallelization, there is no guarantee that the result will be temporally consistent. On the contrary, the temporal consistency terms couple all pairs of adjacent frames, which implies that the energy has to be minimized simultaneously over the whole video volume. This forbids frame parallelization. Furthermore, it is the often the case that the computational cost of minimizing an energy jointly over T frames is much higher than the T times the cost of minimizing the energy over a single frame (the minimization algorithm scales superlinearly or exponentially with the number of variables).

Review of Temporally Consistent Video Editing

Temporally consistent video editing methods can be classified according to the motion model used. The vast majority of professional video editing software is based on parametric closed-form motion models. Parametric models work under assumptions made on the geometry of the scene. The most common case is to assume that the scene is piece-wise planar [25,14]. In professional movie post-production, there are several commercial software programs that allow a visual effects artist to select a planar region which is then tracked automatically by the software. Examples are mocha [22], or Nuke's planar tracker [11]. This model permits the computation of a simple mapping between any pair of frames which can then be used to propagate information from one frame to another. When an object in the editing domain is not planar, the artist needs to segment it into pieces that can be approximated by a plane, and attach a planar tracker to each of them. This process takes time and the result often needs retouching to remove any seems between the different trackers.

On the other hand, non-parametric models do not make assumptions on the geometry of the scene. These models usually estimate the motion in the sequence by the optical flow. There has been in recent years a considerable progress in optical flow computation. For example, state-of-the-art optical flow algorithms are able to deal with some large displacements and allow for sharp discontinuities in the movement. This is the case for [21,8,6,2] to name a few. These methods still suffer from the "aperture" problem: the component of the motion vector tangent to the image level line cannot be estimated. In practice, to alleviate this problem a smoothness term is incorporated. The smoothness term causes a filling-in effect leading to dense flow fields, even if the aperture problem is present.

In the following, the state-of-the-art of temporally consistent video editing based on optical flow are reviewed. Although several optical flow effects have been used in professional movie post-production [19] its use for temporally consistent video editing is still marginal compared to the widespread use of planar trackers.

Examples of Energy Terms with Temporal Consistency

In this section, some models for temporal consistency that have been used in the literature are presented.

Throughout the text symbols with boldface will be used to indicate vector valued quantities and matrices. Non-boldface symbols will indicate scalar valued quantities. Let us note that no distinction will be made when discussing examples of 1D videos, and in these cases non-boldface symbols will be used.

It is considered a continuous spatio-temporal domain $\Omega \times [0,T]$ where $\Omega \subset \mathbb{R}^2$ is a rectangular domain, and $T>0$, and editing domain $0 \subset \Omega \times [0,T]$ with a smooth boundary. In some places in the text, to avoid cluttered equations, it will be used $\Omega^T$ as a notational shorthand for the video domain $\Omega \times [0,T]$. It is denoted temporal "slices" of 0 by $0_t = \{x \in \Omega (x,t) \in 0\}$. Similarly, temporal slices of $\Omega \times [0,T]$ are denoted by $\Omega_t: t \in [0,T]$ representing the frames of the continuous video. An illustration of these domains can be seen in FIG. 1.

Let $u: \Omega \times [0,T] \to \mathbb{R}$ be a given scalar video and let $v: \Omega \times [0,T-1] \to \mathbb{R}^2$ be the corresponding motion field. The value of the motion field at $(x,t) \in \Omega \times [0,T-1]$, $v(x,t)$ represents the velocity of the projection of a particle in the 3D scene onto the image plane [12]. The trajectory of the particle can be obtained by solving the following ordinary differential equation (ODE):

$$\frac{dx}{dt}(t) = v(x(t), t) \qquad (2)$$

Where $t \in [0,T]$. For simplicity it is assumed in this chapter that the functions can be differentiated as many times as needed.

Example 1: Brightness-Constancy Assumption

For a Lambertian object under uniform constant illumination, the brightness of an object's particle does not change in time, which implies that $u(x,t)$ is constant along trajectories. This can be expressed in terms of the total derivative along a trajectory leading to the following brightness-constancy equation [13]:

$$0 = \frac{d}{dt} u(x(t), t) = \nabla u(x(t), t) \cdot v(x(t), t) + \frac{\partial u}{\partial t}(x(t), t) \qquad (3)$$

Where $$\frac{d}{dt} u$$

is me derivative or u along trajectories x(t) and $\nabla u$ refers to the spatial gradient of u. Let us define the convective derivative as:

$$\partial_v u(x, t) := \nabla u(x, t) \cdot v(x, t) + \frac{\partial u}{\partial t}(x, t) \qquad (4)$$

The convective derivative expresses the derivative along trajectories. It is used this notation to shorten our expressions and to make explicit its connection with the field v. The brightness constancy can be enforced by an energy functional such as (1), in which the temporal consistency term penalizes the convective derivative:

$$E^{bc} = \int_0^T \int_{\Omega_t} \partial_v u(x,t)^2 dx dt \qquad (5)$$

By penalizing the convective derivative, this energy enforces the video to vary smoothly along motion trajectories.

The are several options on how to discretize this energy [18]. One way is to use the forward optical flow from t to t+1, of $v^f$. The discrete forward convective derivative is then defined at a point $(x,t) \in \Omega \times \{0, 1, \ldots, T\}$ as follows $$\partial_v^f u(x,t) := u(x+v^f(x,t),t+1) - u(x,t) \qquad (6)$$

When the optical flow has sub-pixel resolution, then $u(x+v^f(x,t),t+1)$ has to be interpolated, for example using bilinear interpolation. With this definition, the above energy reads:

$$E^{bc} = \sum_{t=0}^{T} E_{t,t+1}^{bc}(u_t, t_{t+1}) = \sum_{t=0}^{T-1} \sum_{x \in \Omega} (\partial_v^f u(x, t))^2 \qquad (7)$$

The brightness constancy assumption has been used extensively for the computation of optical flow [24,3], and recently for video interpolation and editing given an (pre-computed) optical flow. In [15] and [20] it is used to perform object removal. In this application, an object segmented by an user. In order to remove it the occluded background has to be recovered. This is done by propagating the visible background along the motion trajectories. The convective derivative is discretized using the forward optical flow.

The authors in [5] use a 3D gradient where the temporal component is given by the convective derivative for temporally consistent gradient based video editing. That work deals with several video editing tasks. They proceed in two steps: first they propagate the color information (using Structure from Motion). The result is temporally consistent in the editing domain, but may have spatial seams. To remedy this, a second step is performed. Using the spatial gradient of the propagated information, an energy functional is proposed with two terms. A term performing a Poisson image editing in each frame imposing spatial consistency; and, a term filtering along motion trajectories to further ensure temporal consistency. These two terms are balanced by a positive parameter. The resulting video is spatially and temporally consistent. This work has been further elaborated into a full-framework in [4] for image and video filtering.

A similar two step procedure was applied in [10]. The difference with [5] is that the first step consisting of propagating colors is done using the convective derivative (instead of using Structure from Motion). In [10] the convective derivative is discretized by alternating between the forward and backward optical flows, which makes the propagation possible through a larger number of frames without degradation. Then, a similar two term energy to the one in [4] is used to remove spatial seams in a temporally consistent manner.

An interesting related approach is followed in [7], where the authors explicitly integrate the optical flow, computing a set of motion trajectories that covers the editing domain. These trajectories are then used to propagate the known color information inside the editing domain. For the computation of these trajectories, the optical flow itself has to be interpolated at sub-pixel positions. Since the optical flow is generally smoother than the frames, the interpolation errors committed are smaller and less noticeable in the resulting video, but can still accumulate causing a considerable drift. This problem is analyzed in [9] where an elegant solution is proposed.

Finally, let us mention the unwrap mosaics approach by [17], which is interesting because it avoids estimating frame-to-frame motion. Instead, the authors propose to compute a static unwrapped texture, a sequence of occlusion masks, and a sequence of transformations from the unwrapped texture to each one of the frames in the video. The editing is then performed directly on the unwrapped texture, and the changes are mapped back into the video sequence using the estimated transformations. The technique of the unwrap mosaics permits to handle a wide range of situations including zooms, geometric deformations and occlusions. The method relies however on a substantial algorithmic machinery including accurate video segmentation, keypoints tracking and nonlinear optimization for computing the texture and mappings. Also, since the mosaics are fixed, the illumination changes must be managed in a post processing step.

Example 2: Global Brightness Change Assumption (GBC)

Under illumination changes, the brightness-constancy assumption does not hold. In this section this assumption is generalized to account for spatially constant, additive illumination changes. In that case, if the trajectories of two particles are followed, the difference of their colors remains constant. The global brightness change assumption is based on this basic observation. Let consider two particles that at time t are in positions $x_0 \in \Omega$ and $y_0 \in \Omega$. Their trajectories are denoted by $\varphi(x_0,s)$ and $\varphi(y_0,s)$ with $s \in [0,T]$. Then for $k>0$, $$u(\varphi(y_0,t+k),t+k) - u(\varphi(x_0,t+k),t+k) = u(y_0,t) - u(x_0,t) \quad (8)$$

This is represented by FIG. 3. After rearranging terms, dividing by k and taking $k \to 0$ thus obtaining $\partial_v u(y_0,t) = \partial_v u(x_0,t)$. Since this holds for all $x_0, y_0 \in \Omega$, it is obtained that $\partial_v u(x,t)$ is a function of t, that is:

$$\partial_v u(x,t) = g(t) \quad (9)$$

Here g(t) expresses the global illumination change rate. Thus, (9) generalizes the brightness constancy model taking into consideration global changes in the illumination.

Taking the spatial gradient on both sides of Eq. (9), a differential version of (8) is found:

$$\nabla \partial_v u(x,t) = 0$$

The authors in [18] proposed a variational method for video editing based on this assumption.

In [18] the authors propose an energy for propagation along optical flow trajectories by penalizing deviations from condition (10):

$$E^{gbc}(u) = \int_0^T \int_{\Omega_t} \|\Pi \partial_v u(x,t)\|^2 dx dt \quad (11)$$

While Equation (10) implies a spatially constant illumination change, the variational model allows some spatial variation on $\partial_v u$. This is a useful feature in practical applications since it accounts for localized light sources, shadows and reflections, as long as they manifest at the boundary of the editing domain.

As before, this energy can be discretized in many ways, depending on the depending on the discretization of the gradient and convective derivative operators [18]. For example, it can be used the forward optical flow to discretize the convective derivative as before, and use it a standard discretization of the gradient by forward finite differences convective derivative $$\nabla^f u(x,t) = [u(x+e_0,t) - u(x,t), u(x+e_1,t) - u(x,t)]^T \quad (12)$$

Where $e_0 = (1,0)^T$ and $e_1 = (0,1)^T$. With this definition, the energy can be written as a sum of terms coupling two consecutive frames $E_{t,t+1}^{gbc}(u_t, u_{t+1})$.

This energy was used in [18] for a video editing task consisting in modifying the surface of objects in the video (for example to add, modify or remove a logo). A user performs the editing in at least one key frame, and this is then propagated to the rest of the frames by the minimization of $E^{gbc}$. The obtain propagation adapts to illumination changes which are spatially smooth.

Example 3: The Gradient Constancy Assumption

Yet another alternative is assuming that the gradient is constant along motion trajectories, which can be expressed as:

$$\partial_v \nabla u(x,t) = 0 \quad (13)$$

In the literature this is referred to as the gradient-constancy assumption [23, 24, 16]. Similarly to (5) and (15) equations, one can define an temporal consistency energy term by penalizing deviations from Eq. (13):

$$E^{gc}(u) = \int_0^T \int_{\Omega_t} \|\partial_v \nabla u(x,t)\|^2 dx dt \quad (14)$$

With the discrete gradient and convective derivate used before, we obtain a discrete version of the energy that can be expressed as a sum of terms coupling two successive frames, $E_{t,t+1}^{gc}(u_t, u_{t+1})$.

This assumption is more restrictive than the global brightness change assumption, since only holds when the motion is a global translation. For this reason, this model has not been used so far for video editing, and has been used mainly for optical flow computation [23].

REFERENCES

[1] R. A. Adams. Sobolev spaces. Academic Press, New York, 1975.

[2] A. Ayvaci, M. Raptis, and S. Soatto. Sparse occlusion detection with optical flow. International Journal of Computer Vision (IJCV), 97(3):322-338, May 2012.

[3] S. Baker, D. Scharstein, J. Lewis, S. Roth, M. Black, and R. Szeliski. A Database and Evaluation Methodology for Optical Flow. International Journal of Computer Vision, 92(1):1-31, 2011. 20

[4] P. Bhat, C. L. Zitnick, M. Cohen, and B. Curless. Gradientshop: A gradient-domain optimization framework for image and video filtering. ACM Transactions on Graphics, 29:1-14, April 2010.

[5] P. Bhat, C. L. Zitnick, N. Snavely, A. Agarwala, M. Agrawala, M. F. Cohen, B. Curless, and S. B. Kang. Using photographs to enhance videos of a static scene. In Proceedings of the Eurographics Symposium on Rendering Techniques, pages 327-338. Eurographics Association, 2007.

[6] T. Brox and J. Malik. Large displacement optical flow: Descriptor matching in variational motion estimation. IEEE Transactions on Pattern Analysis and Machine Intelligence (TPAMI), 33(3):500-513, 2011.

[7] A. Bugeau, P. Gargallo, O. D'Hondt, A Hervieu, N. Papadakis, and V. Caselles. Coherent Background Video Inpainting through Kalman Smoothing along Trajectories. In Modeling, and Visualization Workshop, page 8, 2010.

[8] A. Chambolle and T. Pock. A first-order primal-dual algorithm for convex problems with applications to imaging. Journal of Mathematical Imaging and Vision, 40(1): 120-145, 2011.

[9] T. Crivelli, M. Fradet, P.-H. Conze, P. Robert, and P. Perez. Robust optical flow integration. Image Processing, IEEE Transactions on, 24(1):484-498, January 2015.

[10] G. Facciolo, R. Sadek, A. Bugeau, and V. Caselles. Temporally con-sistent gradient domain video editing. In Energy Minimization Methods in Computer Vision and Pattern Recognition (EMMCVPR), pages 59-73. Springer-Verlag, 2011.

[11] The Foundry. Nuke. https://www.thefoundry.co.uk/products/nuke/[12]B. K. P. Horn. Robot Vision. Electrical Engineering and Computer Science. MIT Press, 1986.

[13] B. K. P. Horn and B. G. Schunck. Determining optical flow. Artificial Intelligence, 17:185-203, 1981.

[14] J. Jia, Y.-W. Tai, T.-P. Wu, and C.-K. Tang. Video repairing under variable illumination using cyclic motions. IEEE Transactions on Pattern Analysis and Machine Intelligence, 28(5):832-9, 2006.

[15] A. C. Kokaram, B. Collis, and S. Robinson. Automated rig removal with bayesian motion interpolation. IEEE Journal on Vision, Image and Signal Processing, 152:407-414, August 2005.

[16] N. Papenberg, A. Bruhn, T. Brox, S. Didas, and J. Weickert. Highly accurate optic flow computation with theoretically justified warping. International Journal of Computer Vision (IJCV), 67(2):141-158, April 2006.

[17] A. Rav-Acha, P. Kohli, C. Rother, and A. Fitzgibbon. Unwrap mosaics: A new representation for video editing. ACM Transactions on Graphics (SIGGRAPH 2008), August 2008, 21

[18] R. Sadek, G. Facciolo, P. Arias, and V. Caselles. A variational model for gradient-based video editing. International Journal of Computer Vision, 103(1):127-162, 2013.

[19] Mike Seymour. The art of optical flow. https://www-.fxguide.com/featured/art_of_optical_flow/, February 2006.

[20] T. Shiratori, Y. Matsushita, X. Tang, and S. B. Kang. Video completion by motion field transfer. In IEEE Conference on Computer Vision and Pattern Recognition (CVPR), pages 411-418, 2006.

[21] D. Sun, S. Roth, and M. J. Black. Secrets of optical flow estimation and their principles. In IEEE Conference on Computer Vision and Pattern Recognition (CVPR), pages 2432-2439, 2010.

[22] Imagineer Systems. Mocha. http://imagineersystems.com/.

[23] S. Uras, F. Girosi, A. Verri, and V. Torre. A computational approach to motion perception. Biological Cybernetics, 60:79-87, 1988.

[24] J. Weickert, A. Bruhn, T. Brox, and N. Papenberg. A survey on variational optic flow methods for small displacements. In O. Scherzer, editor, Mathematical Models for Registration and Applications to Medical Imaging, volume 10 of Mathematics in Industry. Springer, Berlin, 2006.

[25] Y. Zhang, J. Xiao, and M. Shah. Motion Layer Based Object Removal in Videos. In 7th IEEE Workshops on Application of Computer Vision, 2005.

BRIEF DESCRIPTION OF THE INVENTION

According to the shortcomings of the prior art, it would be desirable to reduce the amount of time and calculations needed for editing a video in a feasible way.

The present invention describes a computer-implemented method and a system for the efficient minimization of energies commonly appearing in video editing applications by constructing a series of single frame energies that can be minimized independently, and whose minimizers approximate the minimizers of the original energy.

In particular, the present invention is useful in video editing that uses non-parametric motion models such as the optical flow. However, it is also valid to parametric motion models, since an optical flow can be straightforwardly associated to any transformation between two images.

Thus, it is an object of the present invention, a computer-implemented method and a system that may be applied to editing a video editing a video sequence with temporal consistency.

The computer-implemented method includes at least the steps of:
i) computing a motion field that models temporal consistency between successive frames; ii) defining an energy functional that models the desired properties to be enforced on the video sequence;
iii) splitting the video sequence into two sets, a set with even frames and another set with odd frames;
iv) computing the motion field between consecutive frames on the split sequences;
v) recursively performing steps iii) and iv) until the sets to be split contain one frame to edit;
vi) minimizing the energy functional (or if necessary an adapted version of the energy functional) for each set containing one frame to edit;
vii) merging the edited frames and outputting the edited video sequence.

Optionally, the computer-implemented method may include a previous step of identifying a frame in a video sequence which has an edited object to be propagated.

Optionally, the energy functional includes a summation of editing energies depending on single-frames and temporal coupling energies depending on pairs of consecutive frames.

Optionally, the energy functional may be based on one global brightness change assumption, brightness constancy assumption or gradient constancy assumption.

As to the system, it is suitable for editing a video sequence with temporal consistency and includes a first processing means for computing a motion field modeling temporal consistency between successive frames and for defining an energy functional modeling the properties to be enforced in the video sequence, a second processing means for splitting the video sequence into two sets with even frames and odd frames, wherein the splitting is done recursively until there is only one frame to edit in each set, a third processing means for computing the motion field between consecutive frames in each set after each split, a fourth processing means for minimizing the energy functional on each set to obtain edited frames, a fifth processing means for merging the edited frames and outputting the entire edited video sequence. Any processing means should be construed in the present disclosure as any electronic device comprising a processor.

Optionally, the system may include a sixth processing means for identifying a frame in a video sequence having an edited object to be propagated.

The above processing means should be construed as any multi-purpose computing device or devices for processing and managing data. In particular, these processing means may be implemented as one of more electronic computing devices including, without limitation, a desktop computer, a laptop computer, a network server and the like.

Preferred embodiments of the present invention will be now described by way of example only with reference to the accompanying drawings.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION OF THE INVENTION

Figure 1:
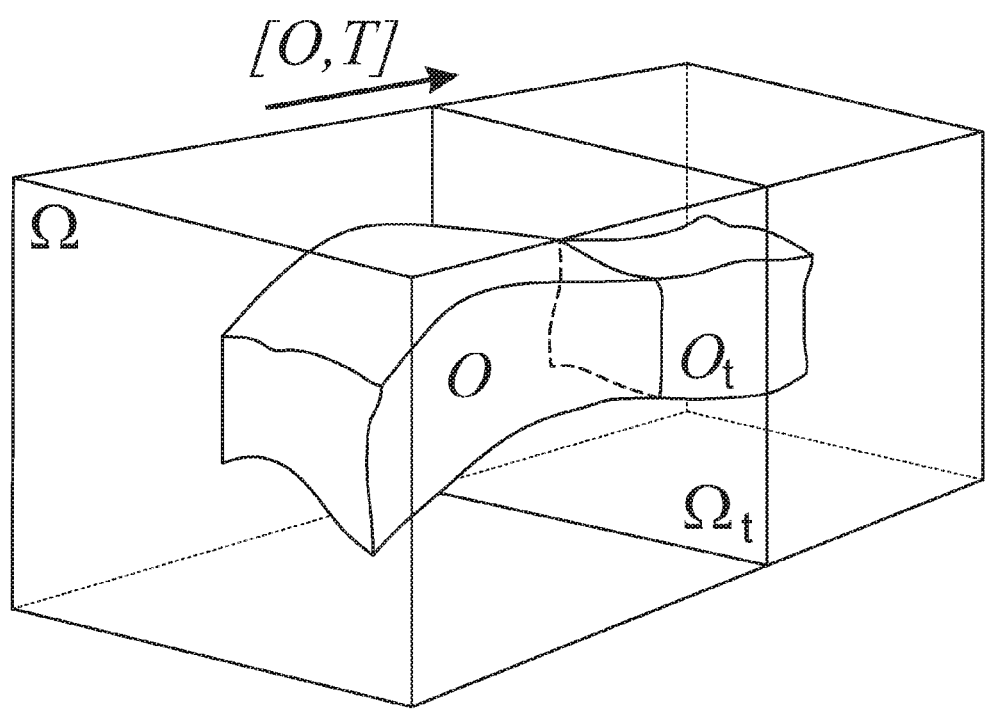
FIG. 1: Illustration of an editing domain inside of the video domain. It also shows the temporal slice at time t.
Figure 2:
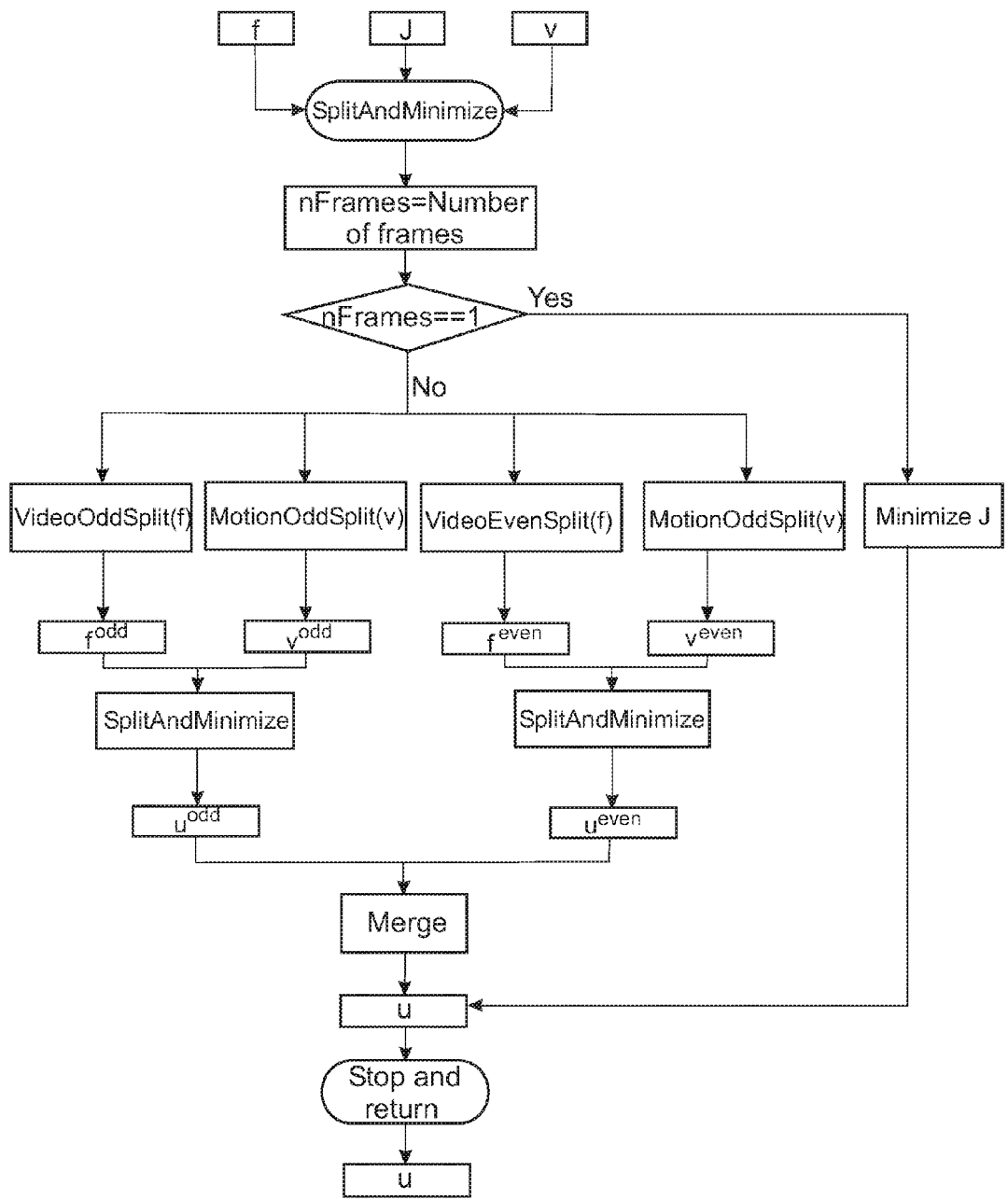
FIG. 2: Diagram of the SplitAndMinimize procedure.

The present embodiment describes a method for reducing the complexity and solving time of video edition schemes assuming temporal consistency. Let $\Omega \times [1,T]$ be the (spatio-temporal video) domain, where where $\Omega \mathbb{R}^2$ is the spatial domain, and $T \geq 1$ represents the frame number within a video. Let $u: \Omega \times [1,T] \to \mathbb{R}^M$ be a given color (M>1) or grey (M=1) video such that u(x,t) represents the pixel value at location x in the frame t. Moreover, let $v: \Omega \times [1,T-1] \to \mathbb{R}^2$ be the corresponding motion field. This motion field gives the correspondence between pixels in frame t and t+1 in such a way that u(x,t)=u(x+v(x),t+1) (under brightness constancy assumption), that is v establishes the temporal coherence in the video.

As a way of example, several algorithms written in pseudo code are defined below for a better understanding. These algorithms can be implemented in any processing device (e.g. a computer) to advantageously edit a video sequence according to the principles of the invention. Especially, the core of the invention can be seen in the sequence of steps to be taken in Algorithm 2.

Algorithm 1: u←Minimize(J,f,v)
Require:
    A grayscale or color video f(x,t),t∈[1,T] composed by T frames. The motion field v(x,t), t∈[1,T−1]
    An energy functional J(u,v,f) to minimize or the partial differential equation that involves the given video f and the motion field v.
Ensure: An edited video u(x,t), t∈[1,T].
1: u←minimum of J(u,v,f) w.r.t. u
Algorithm 2: u←SplitAndMinimize(J,f,v)
Require:
    A grayscale or color video f(x,t),t∈[1,T] composed by T frames. The motion field v(x,t), t∈[1,T−1]
    An energy functional J(u,v,f) to minimize or the partial differential equation that involves the given video f and the motion field v.
Ensure:
    An edited video u(x,t), t∈[1,T].
1. nFrames←number of frames
2. if nFrames is 1 then
    a. u←Minimize (j,f,v) w.r.t. u
3. else{nFrames>1}
    a. $f^{odd}(x,t)$←VideoOddSplit(f)
    b. $f^{even}(x,t)$←VideoEvenSplit(f)
    c. $v^{odd}(x,t)$←MotionOddSplit(v)
    d. $v^{even}(x,t)$←MotionEvenSplit(f)
    e. $u^{odd}$←SplitAndMinimize(J,$f^{odd}$,$v^{odd}$)
    f. $u^{even}$←SplitAndMinimize(J,$f^{even}$,$v^{even}$)
    g. u←Merge($u^{odd}$,$u^{even}$)
4. end if
5. return u
Algorithm 3: $f^{odd}$←VideoOddSplit(f)
Require:
    A grayscale or color video f(x,t),t∈[1,T] composed by T frames
Ensure: A video $f^{odd}(x,t)$ composed by the odd frames from f 1. nFrames←number of frames
2. if nFrames is 1 then
    a. $f^{odd}$ ← f
3. else{nFrames>1}
    a. j ← 1
    b. for i = 1 to i=nFrames do
        i. if i is odd then
            1. $f^{odd}(x,j) = f(x,i)$
            2. j ← j + 1
        ii. end if
        iii. i ← i + 1
    c. end for
4. end if
5. return $f^{odd}$ Algorithm 4: $f^{even} \leftarrow$ VideoEvenSplit(f)
Require:
  A grayscale or color video $f(x,t), t\in[1,T]$ composed by T frames
Ensure: A video $f^{even}(x,t)$ composed by the odd frames from f

```
1. nFrames←number of frames
2. if nFrames is 1 then
      a. f^even ← f
3. else{nFrames>1}
      a. j ← 1
      b. for i = 1 to i=nFrames do
            i. if i is even then
                  1. f^even(x,j) = f(x,i)
                  2. j ← j + 1
            ii. end if
            iii. i ← i + 1
      c. end for
4. end if
5. return f^even
```

Algorithm 5: $v^{odd} \leftarrow$ MotionOddSplit(v)
Require:
  A motion field $v(x,t), t\in[1,T-1]$ from a composed by T frames.
  The number of frames nFrames of the corresponding video.
Ensure: A motion field $v^{odd}(x,t)$ that should be coherent with VideoOddSplit(f)

```
1. nFrames←number of frames
2. if nFrames is 1 then
      a. v^odd ← v
3. else{nFrames>1}
      a. j ← 1
      b. for i = 1 to i=nFrames-1 do
            i. if i is odd then
                  1. v^odd(x,j) ← v(x,i) + v(x + v(x,i), i + 1)
                  2. j ← j + 1
            ii. end if
            iii. i ← i + 1
      c. end for
4. end if
5. return v^odd
```

Algorithm 6: $v^{even}$ MotionEvenSplit(v)
Require:
  A motion field $v(x,t), t\in[1,T-1]$ from a composed by T frames.
  The number of frames nFrames of the corresponding video.
Ensure: A motion field $v^{even}(x,t)$ that should be coherent with VideoEvenSplit(f)

```
1. nFrames←number of frames
2. if nFrames is 1 then
      a. v^even ← v
3. else{nFrames>1}
      a. j ← 1
      b. for i = 1 to i=nFrames-1 do
            i. if i is even then
                  1. v^even(x,j) ← v(x,i) + v(x + v(x,i), i + 1)
                  2. j ← j + 1
            ii. end if
            iii. i ← i + 1
      c. end for
4. end if
5. return v^even
```

Algorithm 7: $u \leftarrow$ Merge($u^{odd}, u^{even}$)
Require:
  Two color or grey video sequences ($u^{odd}, u^{even}$).
  The difference in the number of frames can not be greater than one.
Ensure: A new u video composed by $u^{odd}$ and $u^{even}$

```
1. nFrames^odd←number of frames from u^odd
2. nFrames^even←number of frames from u^even
3. i←1
4. j←1
5. while i←nFrames^odd or i<nFrames^even do
      a. u(x,j)←u^odd(x,i)
      b. u(x,j+1)←u^even(x,i)
      c. i←i+1
      d. j←j+2
6. end while
```

Figure 8:
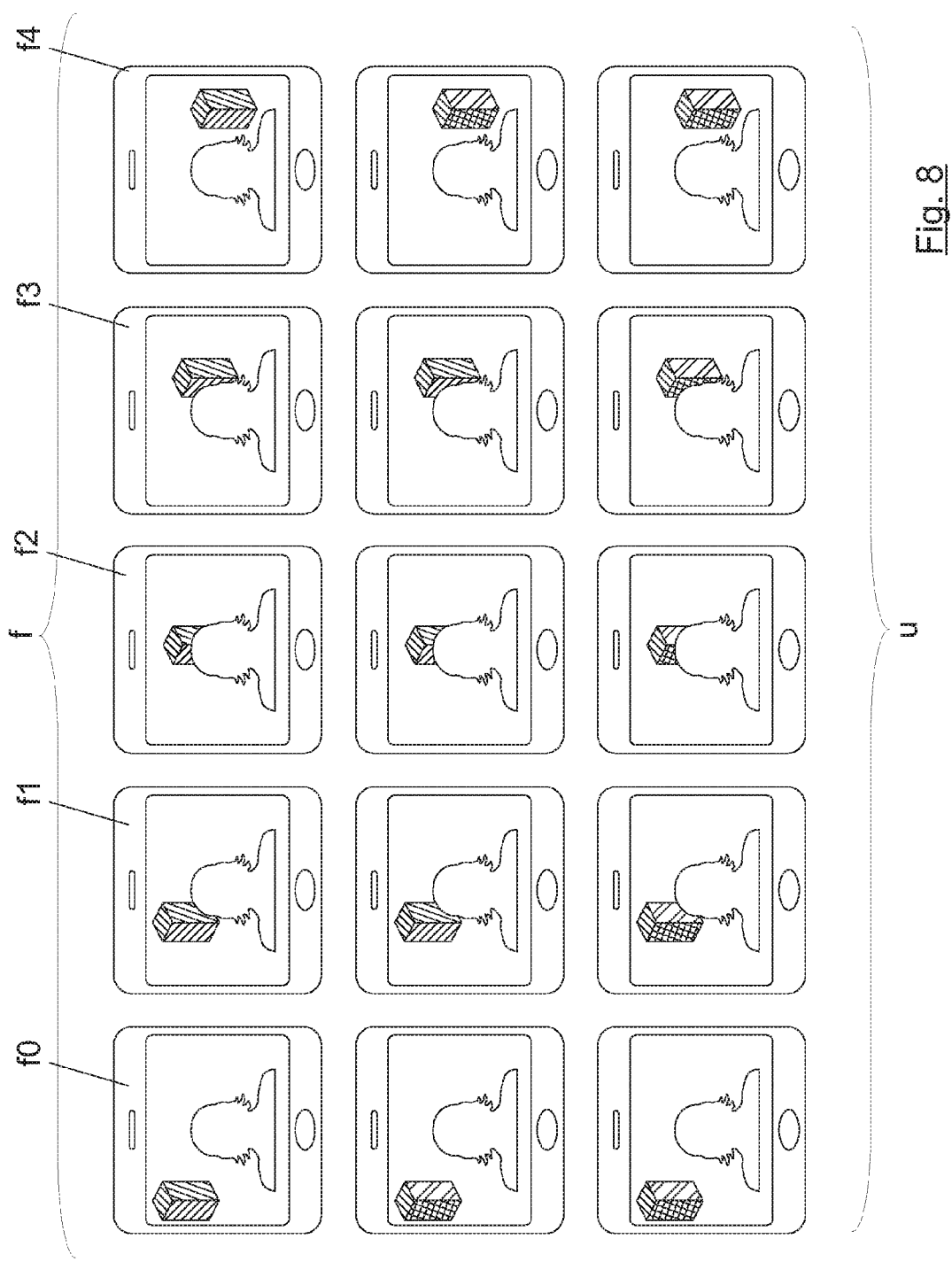
FIG. 8: An example of the type of video editing application that can be accelerated by the disclosed method. First row, original sequence f to edit, second row first and last frame manually edited. Third row desired solution automatically computed.

Now the following video editing problem is considered as an example of how to proceed for solving the problem according to the invention: Let f be a color video composed by 5 frames, as it shown in first row of figure FIG. 8, in which the frames 1 and 5 have been manually edited by changing two sides from the box (second row). The idea is to automatically propagate the information of the first and last frames to the frames in between (frames 2, 3 and 4), as is shown in FIG. 8, third row.

One of the possible methods in the literature for solving this problem goes as follows. Let $0 \subset \Omega \times [1,3]$ be the editing domain (0 is the sides of the box from FIG. 8) with a Lipschitz boundary [1] (to simplify, we can consider that 0 has a smooth boundary). Let $0_t = \{x \in \Omega : (x,t) \in 0 \ t\in[1,3]\}$, i.e. $0_t$ is the editing area of frame t. An illustration of these domains can be seen in FIG. 1. Moreover, let v be the correspondence map between the frames.

The problem can be solved minimizing an energy functional. In this example, the global brightness change assumption is used:

$$J(u) = \int_0^T \int_{\Omega_t} \|\nabla \partial_v u(x,t)\|^2 dx dt \quad (15)$$

Where $\nabla$ is the gradient operator and $\partial_v$ is the convective derivative. Following calculus of variations, the minimum of energy (15) is the solution to the Euler-Lagrange equation given by the following fourth order PDE (Partial Differential Equation)

$$\partial_v^* \text{div } \nabla \partial v(x,t) = 0, \ (x,t) \in 0 \quad (16)$$

where div is the spatial divergence adjoint to $-\nabla$ and $\partial_v^*$ denotes the adjoint operator of the convective derivative, given by $$\partial_v^* f = -\frac{\partial f}{\partial t} - div(vf).$$

This Equation is completed with Dirichlet boundary conditions, $$u(x,t) = u_0(x,t), \ x \in \Omega^t / 0_t \quad (17)$$

According to the present proposal, it is not used the whole video $u_0$ neither the whole correspondence map v. In an informal way, the method applied states as follows: The inputs of the problem are the video f and the connectivity information between consecutive frames. This connectivity information (or motion field) is usually approximated by the optical flow v.

Figure 3:
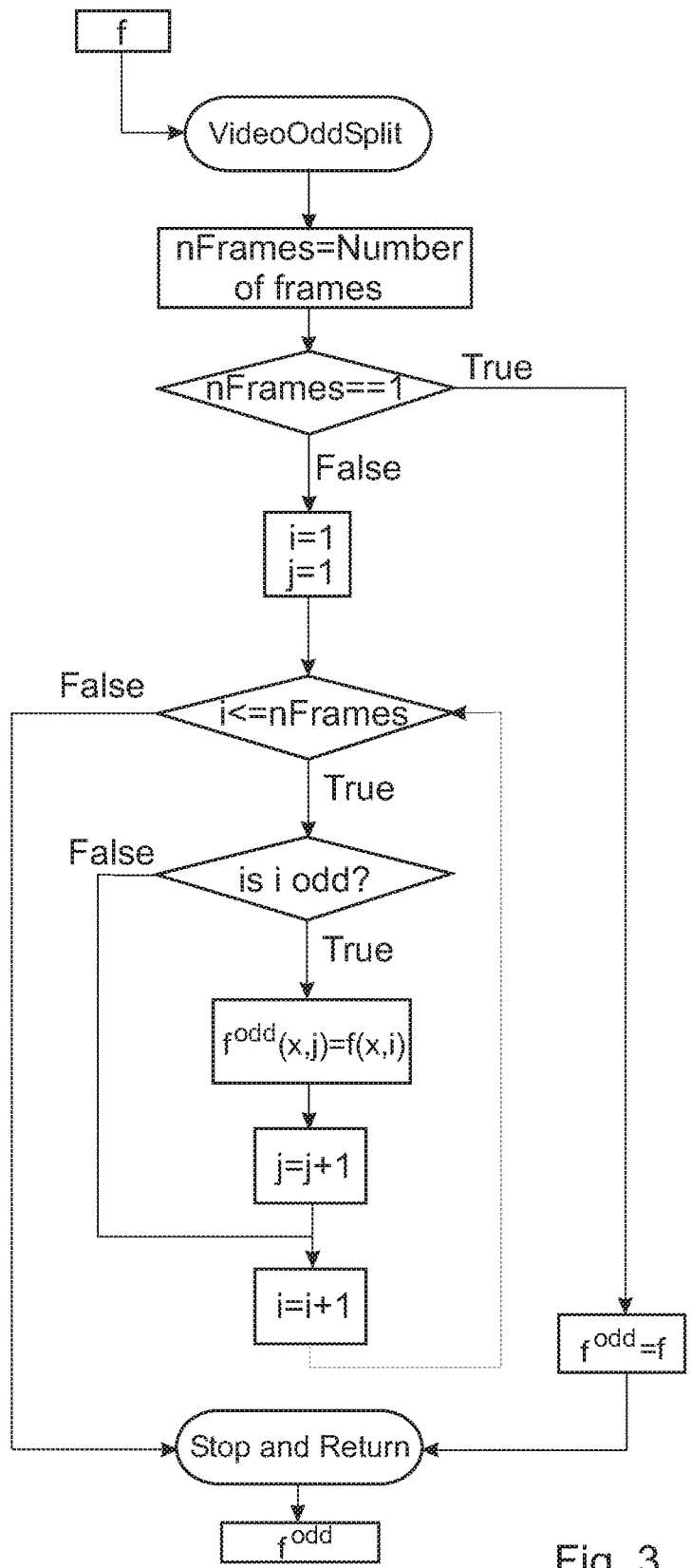
FIG. 3: Diagram of the VideoOddSplit procedure.
Figure 4:
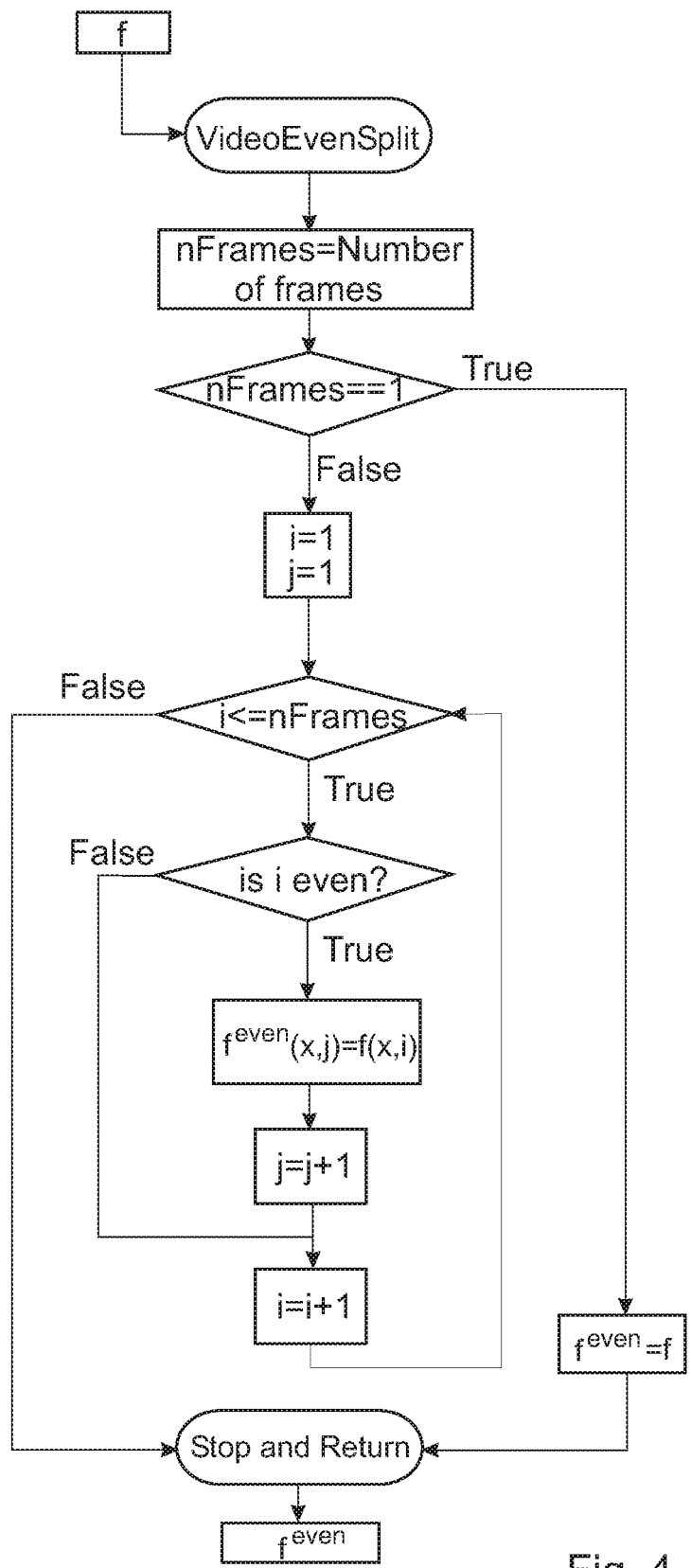
FIG. 4: Diagram of the VideoEvenSplit procedure.
Figure 5:
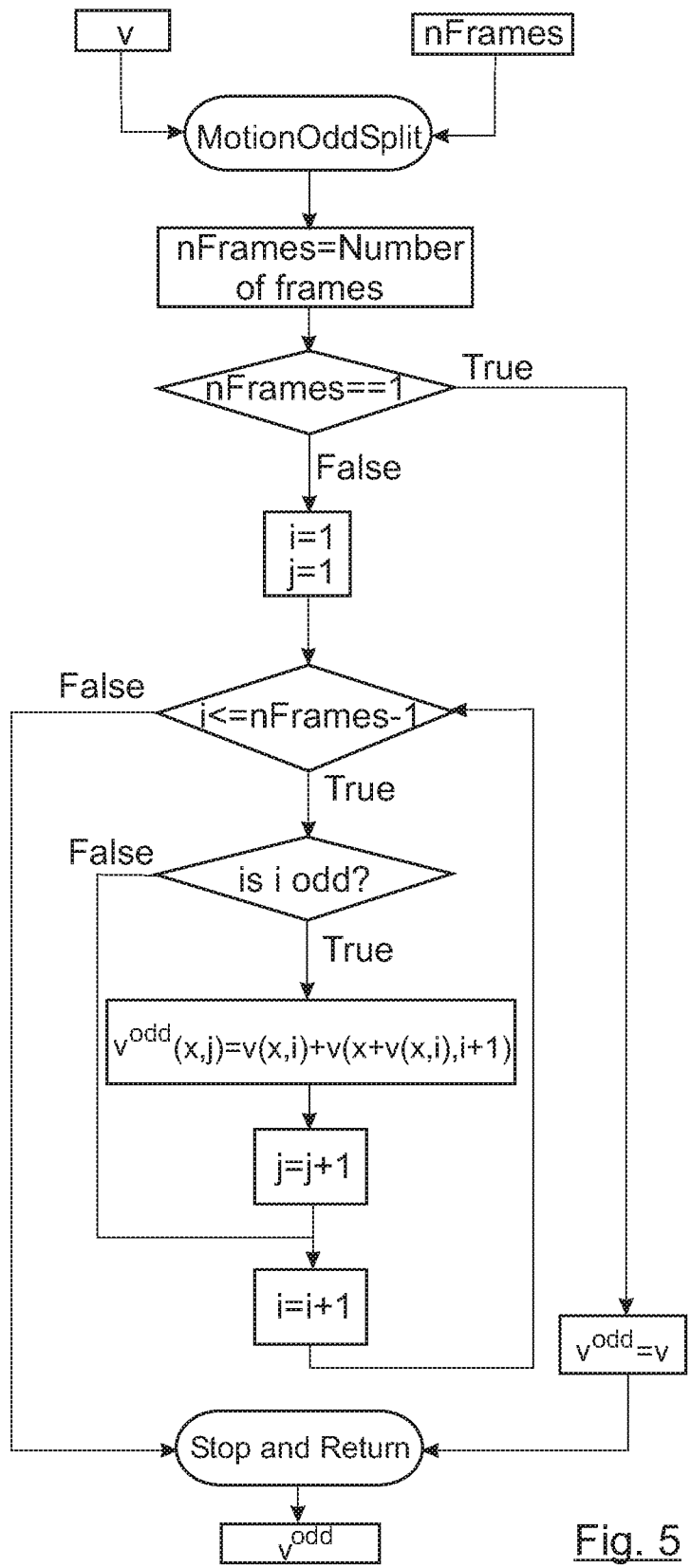
FIG. 5: Diagram of the MotionOddSplit procedure.
Figure 6:
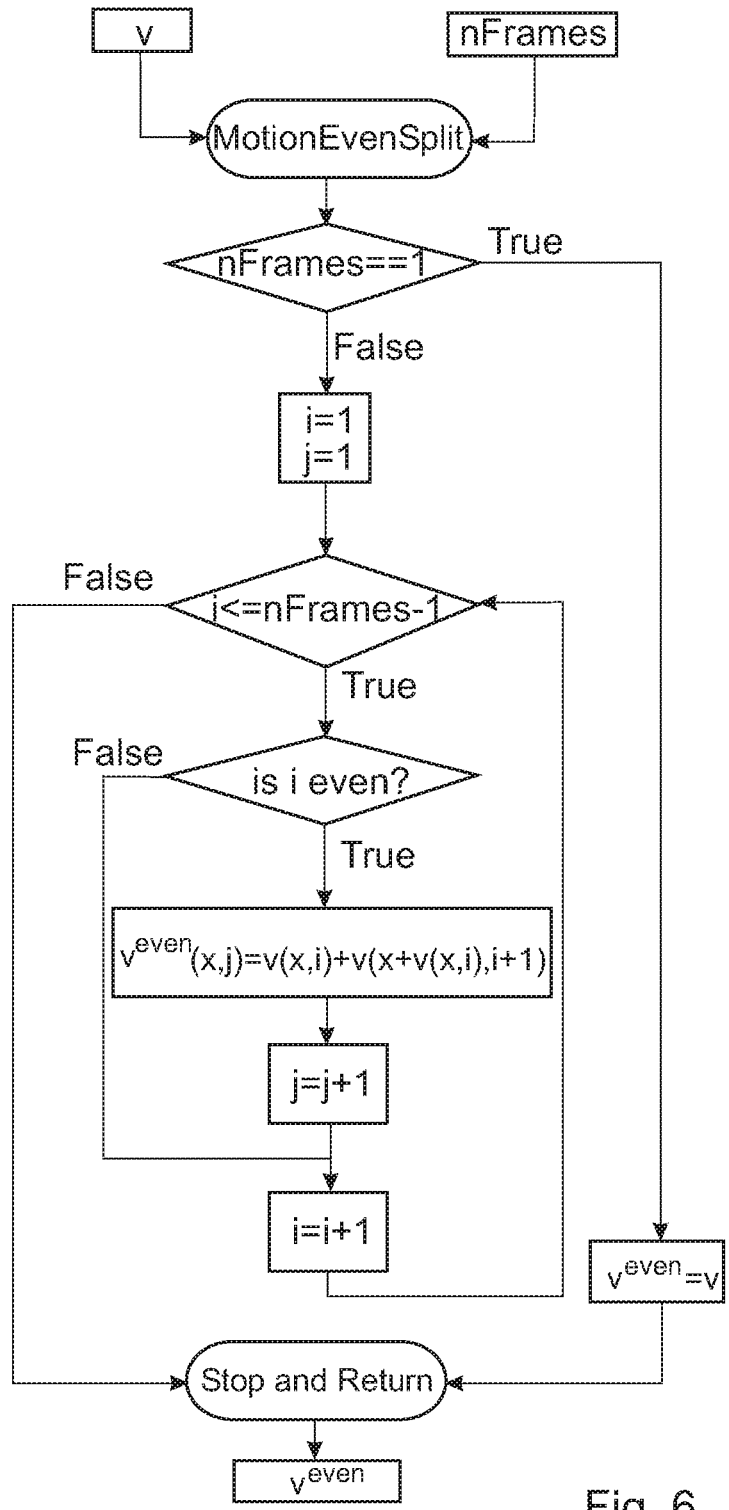
FIG. 6: Diagram of the MotionEvenSplit procedure.
Figure 7:
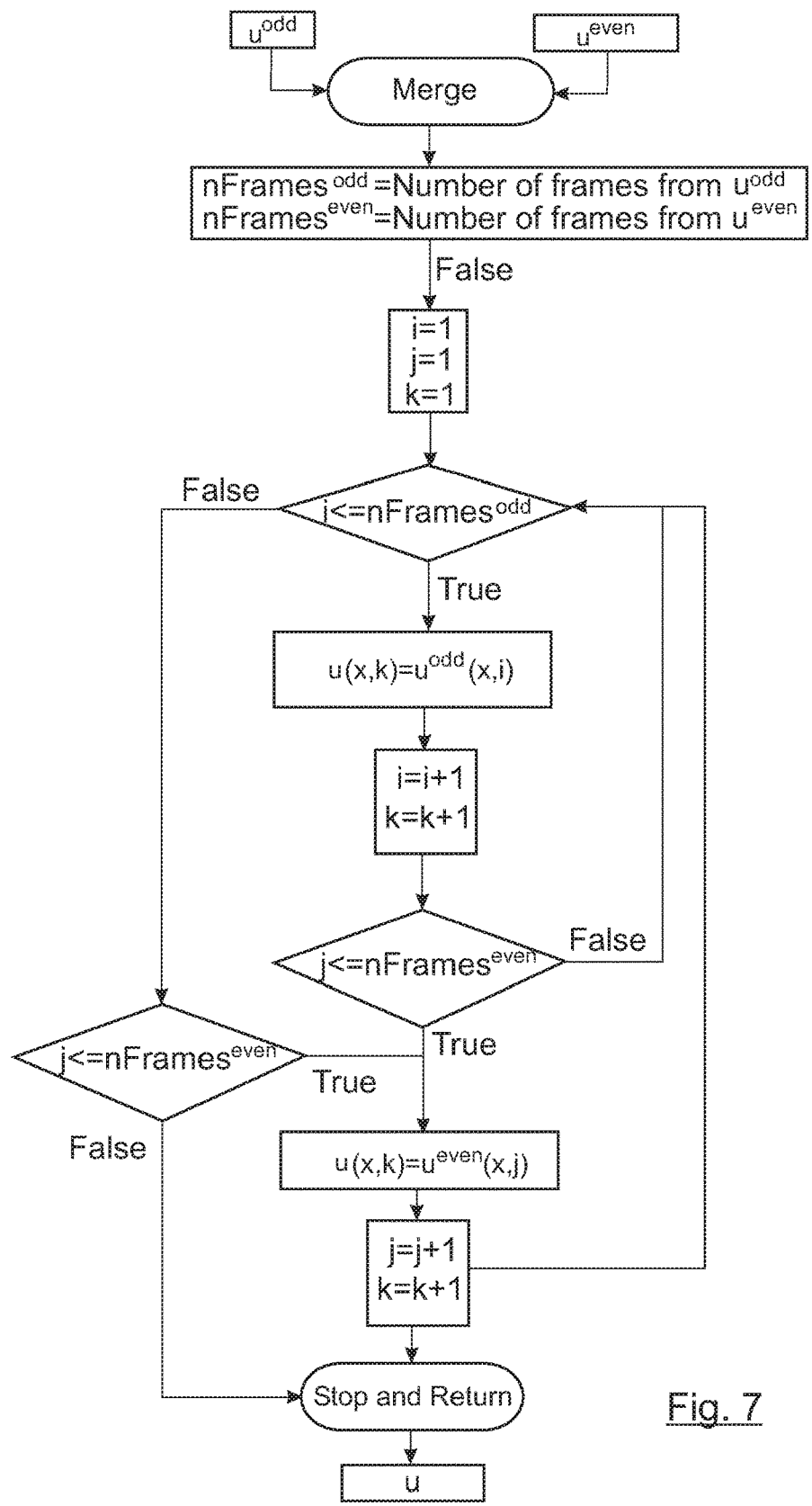
FIG. 7: Diagram of the Merge procedure.

The first step relates to splitting the input video sequence to be edited. According to this step, the input video is split into two sets: The odd frames and the even frames (FIGS. 3 and 4 and algorithms 3 and 4). The motion field also has to be split (FIGS. 5 and 6 and algorithms 5 and 6). This step has to be done recursively until the video sequences has only one frame. In our example we have 3 video sequences at the end of the recursive splitting step that are not really of one frame but of one frame plus the lids (the already edited frames). In this regard, the sequences are called of one frame because there is only one frame that contains unknown values. Once all the videos of one frame plus the lids and their correspondent motion fields are created, the problem is solved independently for each small video. Once it is solved a merging step is needed to re-compose the full output from each individual solution of the many small problems, this is done following FIG. 7 and algorithm 7. This merge may also include some correction steps that are responsible in fixing the possible errors generated by the algorithms 5 and 6.

Now, let us to describe the algorithm 2 step by step in the example context of the previous video editing problem for a video sequence f={f0, f1, f2, f3, f4}, with the manual edited frames {f0, f4} and motion field v={v0, v1, v2, v3}

1. u←SplitAndMinimize(J,f,v) (because f has more than one frame to edit)
   1.1. Split the original video sequence f={f0, f1, f2, f3, f4} following algorithms 3 and 4.
      $f_o$←VideoOddSplit(f)
        $f_o$={f0, f1, f3, f4}
      $f_e$←VideoEvenSplit(f)
        $f_e$={f0, f2, f4}
   1.2. Compute the new motion fields from v following algorithms 5 and 6
      $v_o$←MotionOddSplit(v)
        $v_o$={v(x,0),v(x,1)+v(x+v(x,1),2),v(x,3)}
      $v_{oe}$←MotionEvenSplit(v)
        $v_e$={v(x,0)+v(x+v(x,0),1),v(x,2)+v(x+v(x,2),3)}
   1.3. Solve the problem for each $f_o$, $f_e$ and their corresponding motion fields $v_o$, $v_e$.
      $u_e$←Minimize(J,$f_e$,$v_e$) (because $f_e$ has only one frame to edit)
        $u_e$={f0, $u_e$1,f4}
      $u_o$←SplitAndMinimize(J,$f_o$,$v_o$) (because $f_o$ has more than one frame to edit)
      1.3.1. Split the video sequence $f_o$ following algorithms 3 and 4
          $f_{oo}$←VideoOddSplit($f_o$)
            $f_{oo}$={f0,f1,f4}
          $f_{oe}$←VideoEvenSplit($f_o$)
            $f_{oe}$={f0,f3,f4}
      1.3.2. Compute The new motion fields from $v_o$ following algorithms 5 and 6
          $v_{oo}$←MotionOddSplit($v_o$)
            $v_{oo}$={$v_o$(x,0), $v_o$(x,1)+$v_o$(x+$v_o$(x,1)2)
          $v_{oe}$←MotionEvenSplit($v_o$)
            $v_{oe}$={$v_o$(x,0)+$v_o$(x+v(x,0),1),$v_o$(x,2)}
      1.3.3. Because the number of frames to edit of $f_{oo}$ and $f_{oe}$ is one, we solve
          $u_{oo}$←Minimize(J,$f_{oo}$,$v_{oo}$)
            $u_{oo}$={f0, $u_{oo}$1,f4}
          $u_{oe}$←Minimize(J,$f_{oe}$,$v_{oe}$)
            $u_{oe}$={f0, $u_{oe}$1,f4}
      1.3.4. Merge the solutions $u_{oo}$, $u_{oe}$
          $u_o$←Merge($u_{oo}$, $u_{oe}$)
            $u_o$={f0,$u_{oo}$1,$u_{oe}$1,f4}
   1.3.5. Merge the solutions $u_o$, $u_e$
      u←Merge($u_o$, $u_e$)
        u={f0,$u_{oo}$1,$u_e$1,$u_{oe}$1,f4}
   1.3.6. Return the edited video u.

As apparent, the above algorithms can be coded as instructions in a suitable computer language for automatically performing the described operations when executed on a computer.

Figure 9:
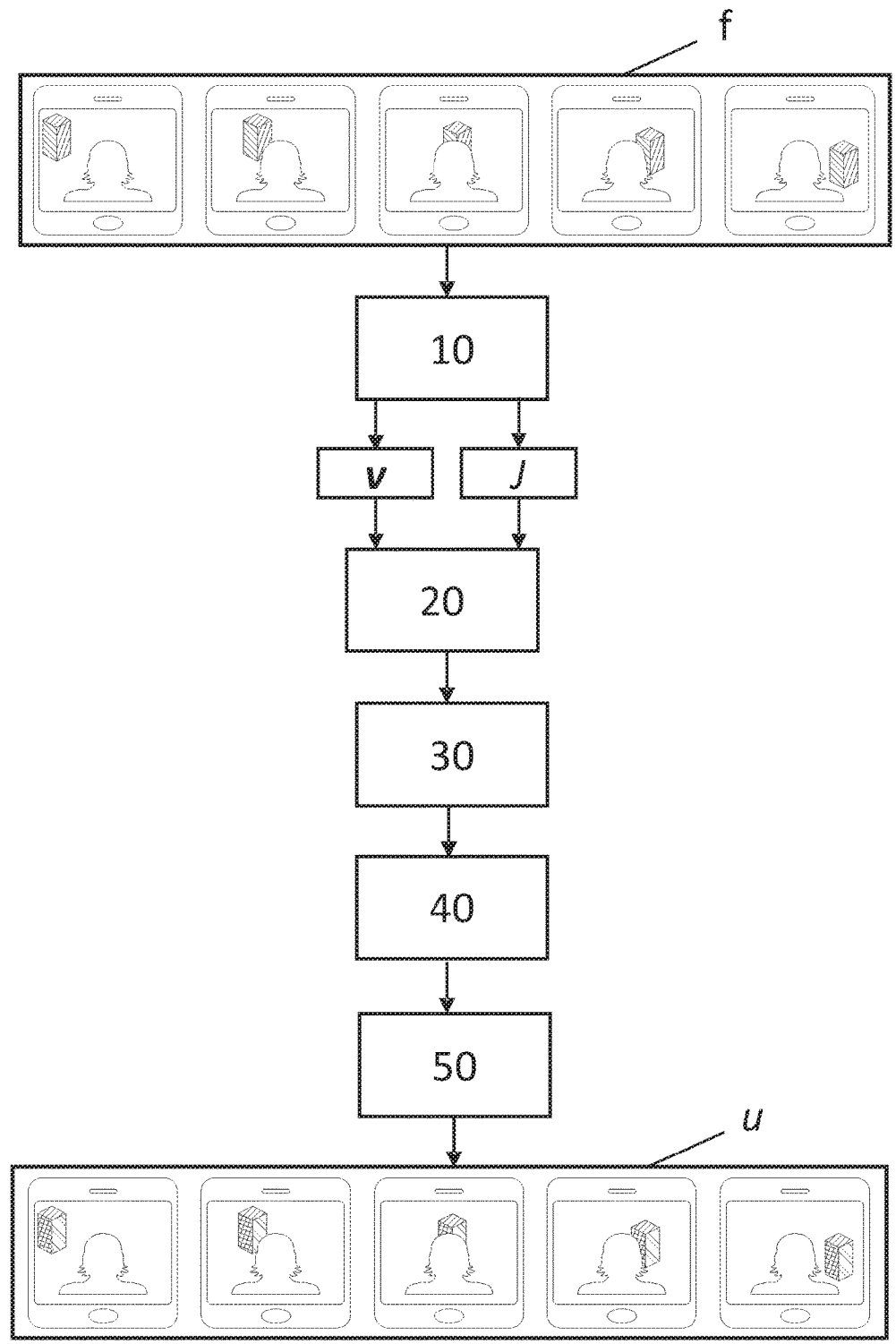
FIG. 9: A block diagram of the main elements of the invention.

FIG. 9 shows a block diagram that represents the main functional elements that manage data in an embodiment. The boxes 10-50 may refer to logical units defined in a computer or computers in a network. A video sequence (t) to be edited is received by a first processing means 10 which computes a motion field (v) that models temporal consistency between successive frames ($f_i$, $f_{i+1}$) and further defines an energy functional (J) that models the properties to be enforced in the video sequence (f). A second processing means 20 recursively splits the video sequence (f) into two sets with even frames ($f^{even}$) and odd frames ($f^{odd}$). This is done until there is only one frame to edit in each set. A third processing means 30 is in charge of computing the motion field (v) between consecutive frames in each set after each division. A fourth processing means 40 minimizes the energy functional (J) on each set to obtain edited frames. Lastly a fifth processing means 50 merges the edited frames and provide the entire edited video sequence (u).

Although the invention has been explained in relation to its preferred embodiment(s) as mentioned above, it can be understood that many other modifications and variations can be made without departing from the scope of the present invention defined by the appended claims.

The invention claimed is:

1. A computer-implemented method for editing a video sequence with temporal consistency comprising the steps of:
   i) computing a motion field modeling temporal consistency between successive frames;
   ii) defining an energy functional modeling the desired properties to be enforced on the video sequence;
   iii) splitting the video sequence into two sets with even frames and odd frames;
   iv) computing the motion field between consecutive frames on the splitted sequences;
   v) recursively performing steps iii) and iv) until the sets to be split contain one frame to edit;
   vi) minimizing the energy functional for each set containing one frame to edit;
   vii) merging the edited frames and outputting the edited video sequence.

2. The computer-implemented method of claim 1, wherein it comprises a previous step of identifying a frame in a video sequence having an edited object to be propagated.

3. The computer-implemented method of claim 1, wherein the energy functional comprises a summation of editing energies depending on single-frames and temporal coupling energies depending on pairs of consecutive frames.

4. The computer implemented method of claim 1, wherein the energy functional is based on at least one of the following model:
   global brightness change assumption;
   brightness constancy assumption;
   gradient constancy assumption.

5. A system for editing a video sequence with temporal consistency comprising:
   a first processing means or computing a motion field (v) modeling temporal consistency between successive frames ($f_i$, $f_{i+1}$) and for defining an energy functional (J) modeling the properties to be enforced in the video sequence (f);

a second processing means for splitting the video sequence (f) into two sets with even frames ($f^{even}$) and odd frames ($f^{odd}$), wherein the splitting is done recursively until there is only one frame to edit in each set;

a third processing means for computing the motion field (v) between consecutive frames in each set after each split;

a fourth processing means for minimizing the energy functional (J) on each set to obtain edited frames;

a fifth processing means for merging the edited frames and outputting the entire edited video sequence (u).

6. A system for editing a video sequence with temporal consistency of claim 5, comprising a sixth processing means for identifying a frame in a video sequence having an edited object to be propagated.

7. A computer program product for editing a video sequence with temporal consistency comprising computer code instructions stored thereon that, when executed by a processor, causes the processor to perform the method of claim 1.

* * * * *